United States Patent

[11] 3,576,439

| [72] | Inventor | Carlos G. Figueroa<br>Columbus, Ohio |
|---|---|---|
| [21] | Appl. No. | 635,840 |
| [22] | Filed | May 3, 1967 |
| [45] | Patented | Apr. 27, 1971 |
| [73] | Assignee | Industrial Nucleonics Corporation |

[54] MATERIAL DETECTOR USING SEMICONDUCTOR PROBE AND RADIOACTIVE-CHEMICAL REACTION
14 Claims, 5 Drawing Figs.

| [52] | U.S. Cl. | 250/83.3, 250/106 |
|---|---|---|
| [51] | Int. Cl. | G01t 1/24 |
| [50] | Field of Search | 250/83.3, 106 (T) |

[56] References Cited
UNITED STATES PATENTS

| 3,242,717 | 3/1966 | Matle et al. | 73/27 |
|---|---|---|---|
| 3,329,022 | 7/1967 | Feldman | 73/358 |
| 3,366,574 | 1/1968 | Chleck | 250/106X |
| 3,119,016 | 1/1964 | Attix | 250/83.3X |

OTHER REFERENCES

OZONE ANALYZER USES RADIOACTIVE CLATHRATE, by Hommel et al. from NUCLEONICS, May 1961, pgs. 94, 96, 98, 100, 102

ISOTOPE TECHNOLOGY DEVELOPMENT, from ISOTOPES and RADIATION TECHNOLOGY Vol. 3, No. 3, Spring 1966, pgs. 206 to 231

KRYPTONATES: KR 85 BECOMES A UNIVERSAL TRACER, by Chleck et al. from NUCLEONICS, Vol. 21, No. 7, July 1963; pg. 53, 54, 55

*Primary Examiner*—Archie R. Borchelt
*Attorneys*—Marechal, Biebel, French & Bugg, William T. Fryer, III, C. Henry Peterson and James J. O'Reilly ABSTRACT: Oxygen, hydrogen, sulfate ion and other materials are quantitatively determined by a solid-state detector which receives radiation from an element which is chemically reactive with the material being determined. The element contains the inert gas radioisotope krypton-85 interstitially retained within the lattice of the element and released during the reaction with the material being determined. The change in residual radioactivity of the element, as a function of current output of the solid-state detector, is indicated in terms of percentage by a utilization circuit including a differentiating circuit.

Patented April 27, 1971

3,576,439

INVENTOR
CARLOS G. FIGUEROA
BY
Marechal, Biebel, French & Bugg
ATTORNEYS

MATERIAL DETECTOR USING SEMICONDUCTOR PROBE AND RADIOACTIVE-CHEMICAL REACTION

FIELD OF INVENTION

This invention relates to a semiconductor quantitative detector and more particularly to a semiconductor detector and utilization device including an element-containing krypton–85 wherein the element reacts with a specific material thereby releasing the radioisotope, and wherein the residual amount of radioisotope in the element is monitored as a function of the percentage of unknown.

TECHNICAL BACKGROUND

Krypton–85 is an inert gas radioisotope having a half life of 10.6 years and which emits beta radiation (670 kev) and gamma (517 kev) in the approximate ratio of 4.6 gammas for each 1000 betas. The atomic diameter of krypton–85 is relatively small, e.g., 3 to 4 A units and thus the atoms of krypton–85 are able to penetrate and be retained interstitially in the lattice of a host material.

Virtually any material may be kryptonated (that is, be processed to introduce the radioisotope interstitially within the lattice) to varying activities depending on the host material used. Incorporation of krypton–85 into a host material has been carried out by several methods. In one method, krypton–85 atoms are ionized and drawn to the host material by applying a potential drop across the ion generating source and host material. In a second method, the host material is impregnated by diffusing the atoms of krypton–85 into the host material by use of high pressure and temperature. A specific procedure for kryptonating solids under pressure and temperature conditions is disclosed in copending application Ser. No. 609,226, filed Jan. 13, 1967, and assigned to this assignee.

DESCRIPTION OF THE PRIOR ART

If a radioisotope (krypton–85 ) bearing host material is selected to react chemically with a specific material whose presence is to be determined quantitatively, the reaction results in the release of krypton–85 in an amount proportional to the rate of the reaction. It is known from report NYO–2757–C–3 of the United States Atomic Energy Commission to utilize this phenomena in quantitative measurements by analyzing the released krypton–85 rather than the amount retained in the host material. In the case of gaseous materials such as hydrogen and oxygen which pass over a reactive radioisotope-bearing material, the effluent is monitored for the released krypton–85. The above-described system requires a flow meter and counting chamber as well as a Geiger-Mueller tube to indicate the amount of krypton–85 in the effluent being measured, and thus, is relatively cumbersome.

SUMMARY OF THE INVENTION

By the present invention, a simple relatively small probe is provided in which a semiconductor responsive to radiation produces an electrical signal in response to the amount of krypton–85 retained in the host material. The host material is selected for reaction with a specific material to be quantitatively determined, and after calibration of the particular probe with known amounts of the various particular materials to be quantitatively determined, the probe is exposed to the particular material to be measured and the output current is thereafter electronically analyzed by a utilization circuit including a differentiating circuit which produces an indication of the amount of the unknown being determined. The probe itself includes a current generating solid-state semiconductor whose output current is a function of the amount of radioactivity remaining in the sensitive element of the probe. The sensitive element itself includes the inert gas radioisotope krypton–85 interstitially retained within the lattice, and reaction of the host material results in the release of krypton–85 so that the level of residual krypton–85 is less after each use. The output signal from the solid-state semiconductor is differentiated and in effect generates a curve, the slope of which is indicative of the percentage of the unknown.

Accordingly, it is a primary object of the present invention to provide a solid-state detector for the quantitative determination of an unknown wherein the detector includes a semiconductor and a radioisotope-bearing material, the radioisotope-bearing material being comprised of a host material specifically reactive to the unknown being determined, and wherein the semiconductor produces a current indicative of the residual radioisotope in the host material as a function of the percentage of the unknown being determined.

Another object of the present invention is the provision of a semiconductor detector of the type described wherein the radioisotope is krypton–85 and including a utilization device, the latter including a differentiating circuit for indicating the percentage of unknown being measured.

Other objects and advantages of the invention will be apparent from the following description, the accompanying drawing and the appended claims.

DESCRIPTION OF THE INVENTION

Figure 1:
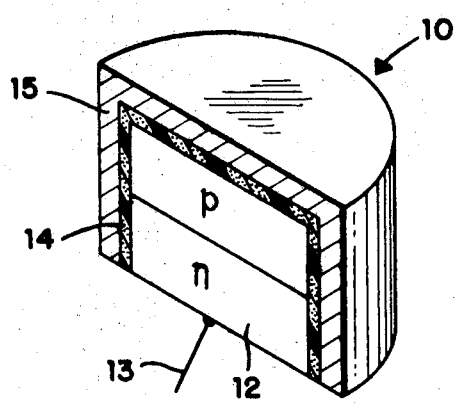
FIG. 1 is a simplified view partly in section and partly in elevation of a semiconductor detector in accordance with the present invention.

Referring to FIG. 1, which illustrates a preferred embodiment of the invention, the detector 10 includes a solid-state semiconductor element 12 such as a $p/n$ junction germanium or silicon-based detector element having an output lead 13 attached thereto. Positioned over the working face of the detector element 12 and in contact therewith is a cover member 14 of aluminum or nylon which is relatively thin in order to reduce as much as possible, losses by attenuation. The aluminum or nylon cover may be of the order of 0.1 micron in thickness. Positioned over the cover 14 is a radioisotope-bearing material 15 which is in radiation transmitting relation with the detector element 12.

The radioisotope-bearing material includes a host material whose surface has been treated to incorporate therein an inert gas radioisotope such as krypton–85 which is interstitially retained within the lattice of the host material. The composition of the host material may vary widely depending upon the composition of the unknown to be determined quantitatively. For example, for determination of the percentage of oxygen gas the host material is pyrolytic graphite, while platinum dioxide or copper dioxide may be used for the quantitative determination of hydrogen gas. Sulfate ion may be determined by utilizing a host material of barium carbonate while calcium carbide may be used to determine the percentage of water in a mixture.

Figure 2:
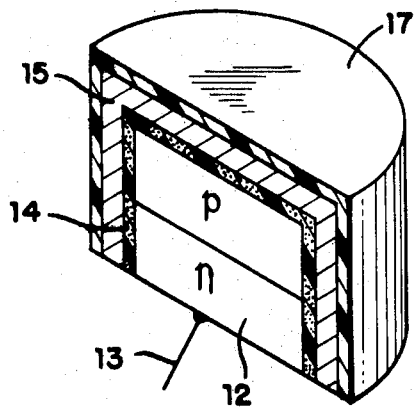
FIG. 2 is a view partly in section and partly in elevation of a modified form of detection in accordance with this invention.

Referring to FIG. 2 wherein like reference numerals have been employed, the radioisotope-bearing material 15 is substantially completely covered by a gas permeable plastic cover element 17 such as a thin film of polytetrafluoroethylene, fluorinated ethylene, propylene and the like which permits passage through the cover of the composition to be quantitatively determined.

One feature of the present invention relates to interchangeability of radioisotope-bearing materials for any specific material being analyzed. For example, different radioisotope-bearing materials may be provided and stored in an inert atmosphere, and assembled over the cover member 14 so that a single detector element may be utilized in the analysis of various compositions. As shown in the simplified view in FIGS. 1 and 2, the radioisotope-bearing materials are snapped over cover 14, but other forms may be used, for example, the radioisotope-bearing material may be formed into a cartridge which is assembled to the detector.

As noted previously, the surface of the host material includes the radioisotope krypton-85 interstitially retained within the lattice, and the radioisotope-bearing material is assembled to the detector element 12 and cover member 14 so that the surface bearing the krypton-85 is spaced from the cover member 14 and in contact with the material to be analyzed. It is preferred that the host material be relatively thin in order to reduce attenuation of the emitted beta and gamma which passes through the relatively thin cover to the detector element 12 to produce a current, the intensity of the current varying in accordance with the residual amount of krypton-85 in the radioisotope-bearing material.

In operation, the probe is preferably stored in an inert atmosphere such as a nitrogen gas and then exposed to the material being analyzed. Due to a chemical reaction between the material being analyzed and the host material, for example, hydrogen and platinum dioxide, krypton-85 is released from the host material resulting in a change in the current produced by the detector element 12. As more krypton-85 is released, the output current from the detector decreases.

Figure 3:
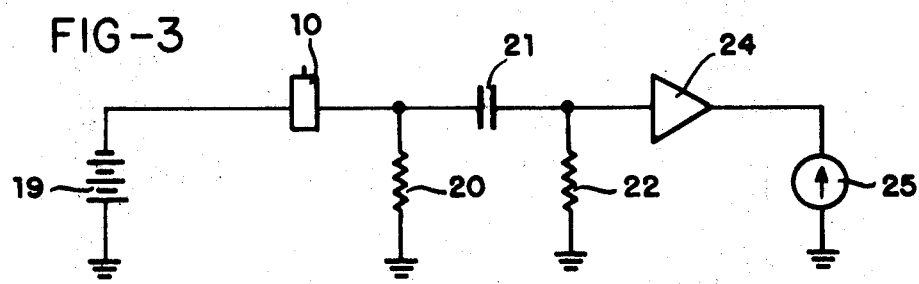
FIG. 3 is a schematic view of the utilization means and differentiating circuit for indicating the percentage of an unknown to be measured.

Referring to FIG. 3, a schematic circuit is shown of a utilization device for providing an indication of the change in current output of the detector 10. The circuit includes a power supply shown as a battery 19, detector 10, schematically illustrated, and a resistor 20 which provides an input voltage to a differentiating circuit which includes capacitor 21 and resistor 22. The output of the differentiating circuit is then fed to an amplifier 24 which supplies an electrical signal to a meter 25.

Figure 4:
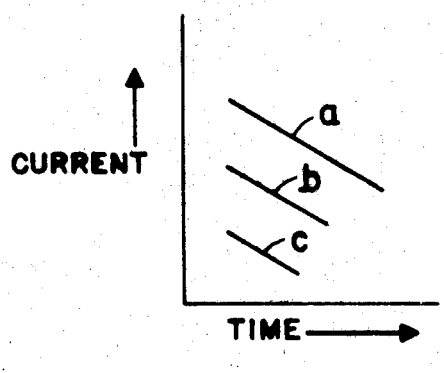
FIG. 4 is a graph showing the relationship between time and current in tests of an unknown of the same percentage composition.

The differentiating circuit operates electronically to obtain, in effect, a curve whose slope is representative of the amount of material being analyzed. Referring to FIG. 4, a graph is shown in which the ordinate is current and the abscissa is time. In curve $a$ the current decreases with time because the residual krypton-85 decreases upon exposure to the unknown. The differentiating circuit in effect provides a curve whose slope represents a predetermined amount of the unknown. If the same detector is thereafter exposed to the same quantity of the unknown a curve such as that shown at $b$ is generated and while the comparative value of current is less than $a$, the slope of $b$ is the same as that of curve $a$. In similar fashion, a third and subsequent exposure of the detector element to the same quantity of the unknown results in still another curve $c$ whose slope is the same as $a$ and $b$ but whose absolute value of current is less than that of $c$.

Figure 5:
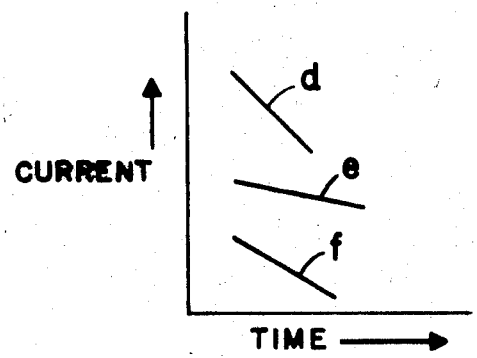
FIG. 5 is a graph of current versus time showing the curves generated by an unknown of different percentage composition.

Referring now to FIG. 5, a graph is shown again with current as the ordinate and time as the abscissa showing curves $d$, $e$ and $f$ each of which has a different slope and each of which represents a different quantity of material being analyzed.

The procedure for utilizing the detector of the present invention involves a calibration procedure by which the detector is momentarily exposed to different known concentrations of a material being analyzed, for example, hydrogen gas with a platinum dioxide host material. The detector is maintained in contact with the sample of known composition until an equilibrium is established as indicated on the meter 25. This procedure requires only a very short time. Thereafter, the detector is exposed to a second sample of different known composition and the meter is again observed to determine the value at equilibrium. The percentage of the composition to be determined in the calibration samples are selected so as to represent the limits within which the detector is to be used. Once the two calibration values are determined by test, intermediate values can be extrapolated in a conventional manner.

Since the reactions between the host material and material being analyzed are ionic in nature they are fairly rapid so that the times involved are fairly short. Radioisotope-bearing materials of the type above described are known which have a useful life of between 80 to 200 minutes depending on the concentration of the unknown being analyzed. After calibration, the probe may then be used for quantitative analysis of various materials, and the results interpreted against the calibration values. It is preferred in accordance with the present invention that the temperature during quantitative determination of the unknown be approximately the same as the calibration temperature because of the effect temperature has on the rate of reaction. It is also understood that rather than utilizing a meter for providing a visual indication, a recording element may be employed, or circuitry, well known, may be utilized to provide an audible signal such as an alarm when the concentration of the material being analyzed falls below a predetermined level.

It is also possible in accordance with the present invention to provide a probe which includes a base member having interstitially retained inert gas radioisotope (krypton-85) therein and wherein the base member is integral with a radiation detector which is responsive to the retained radioisotope in the base member. Rather than employ a semiconductor element, the detector element may be composed of a scintillation crystal whose light output is received by a photomultiplier tube the output of which is fed to a utilization circuit as previously described.

In the arrangement above described, it is understood that different base members may be utilized which are specific in their reaction to different unknowns to be determined, and thus, it is advantageous to provide for easy replacement for changing of the base member as previously described.

The detector of the present invention may also be utilized as a monitor to indicate the presence of a specific material in a mixture, for example, which may be used to determine when oxygen is present in a stream of gas not normally containing oxygen. Used in this way, the detector may be described as a "spot" detector.

While the forms of apparatus herein described constitute preferred embodiments of the invention, it is to be understood that the invention is not limited to these precise forms of apparatus, and that changes may be made therein without departing from the scope of the invention which is defined in the appended claims.

I claim:

1. A semiconductor detector sensitive to a specific reaction as an indication of the quantity of an unknown to be measured comprising a semiconductor member including means defining a working face, cover means over said working face and permeable to radiation, radioisotope-bearing material in contact with at least a portion of said cover means and in radiation transmitting relation with said working face for releasing radiation in the presence of the unknown, said material comprising a base member and an interstitially retained inert gas radioisotope, said base member being so coordinated and correlated with the unknown as to react therewith thereby releasing said radioisotope as a function of the quantity of the unknown, and said semiconductor operative to produce an output current in response to impingement of radiation thereon.

2. A semiconductor detector as set forth in claim 1 further including utilization means receiving said output current and indicating the amount of said unknown.

3. A semiconductor detector as set forth in claim 1 wherein said inert gas radioisotope is krypton-85.

4. A semiconductor detector as set forth in claim 3 wherein the unknown to be measured is hydrogen gas and said base member is platinum dioxide, and wherein said inert gas radioisotope is krypton-85.

5. A semiconductor detector as set forth in claim 3 wherein the unknown to be measured is oxygen gas and said base member is graphite, and wherein said inert gas radioisotope is krypton-85.

6. A semiconductor detector as set forth in claim 3 wherein the unknown to be measured is the sulfate ion and said base member is barium carbonate, and wherein said inert gas radioisotope is krypton–85.

7. A semiconductor detector as set forth in claim 2 wherein said utilization means includes a differentiating circuit.

8. A semiconductor as set forth in claim 1 wherein said radioisotope-bearing material is covered by a gas permeable material.

9. A semiconductor detector as set forth in claim 1 wherein said semiconductor member is a solid-state material including a p/n junction.

10. A semiconductor detector as set forth in claim 1 wherein said radioisotope-bearing material is replaceable by a different radioisotope material responsive to an unknown different from said unknown.

11. Apparatus for detecting the presence of a constituent element in an environment comprising, a probe including a base member having an interstitially retained inert gas radioisotope, said base member being selected to react primarily with said constituent element to release a portion of said retained radioisotope, and a radiation detector mounted integrally with said base member and responsive to said retained radioisotope for providing an indication of the presence of said constituent element in said environment.

12. Apparatus as in claim 11 wherein said radiation detector is physically mounted against said base member.

13. Apparatus as in claim 11 wherein said base member is releasably secured to said radiation detector.

14. Apparatus as in claim 11 wherein said radiation detector comprises a semiconductor detector.